United States Patent
Weldon

(10) Patent No.: US 6,895,944 B1
(45) Date of Patent: May 24, 2005

(54) VAPOR FUEL SYSTEM AND METHOD FOR EVAPORATIVE FUEL VAPOR ENGINE

(75) Inventor: Craig Andrew Weldon, Chatham (CA)

(73) Assignee: Siemens VDO Automotive, Inc., Chatham (CA)

(*) Notice: Subject to any disclaimer, the term of this patent is extended or adjusted under 35 U.S.C. 154(b) by 0 days.

(21) Appl. No.: 10/777,182

(22) Filed: Feb. 13, 2004

(51) Int. Cl.[7] ............................................. F02M 33/02
(52) U.S. Cl. ..................................... 123/520; 123/516
(58) Field of Search ................................ 123/520, 519, 123/518, 516

(56) References Cited

U.S. PATENT DOCUMENTS

| | | | | |
|---|---|---|---|---|
| 4,872,439 A | * | 10/1989 | Sonoda et al. | 123/519 |
| 5,111,795 A | * | 5/1992 | Thompson | 123/519 |
| 5,165,379 A | * | 11/1992 | Thompson | 123/520 |
| 5,355,861 A | * | 10/1994 | Arai | 123/519 |
| 6,526,950 B2 | * | 3/2003 | Ito et al. | 123/518 |
| 6,689,196 B2 | * | 2/2004 | Amano et al. | 96/112 |
| 6,701,902 B2 | * | 3/2004 | Koyama et al. | 123/519 |
| 2002/0124836 A1 | * | 9/2002 | Reddy | 123/518 |

FOREIGN PATENT DOCUMENTS

JP          10197517 A    *   7/1998

* cited by examiner

*Primary Examiner*—Mahmoud Gimie

(57) ABSTRACT

A vapor fuel generation and management system for an evaporative fuel vapor engine includes a fuel tank that stores an evaporative liquid fuel, and a carbon canister connected to the headspace of the fuel tank to absorb and retain fuel vapor. A fuel vaporization unit has a liquid fuel inlet in communication with a liquid fuel outlet of the fuel tank, and a fuel vapor inlet in communication with the carbon canister. The fuel vaporization includes an agitator member at least partially submersed in a liquid fuel bath, and a motive force device that drives the agitator member. The fuel vaporization unit generates vapor fuel, i.e. a rich air/fuel mixture, and has a vapor fuel outlet in communication with an engine intake manifold. A purge valve controls vapor fuel flow to the engine intake manifold.

24 Claims, 3 Drawing Sheets

VAPOR FUEL SYSTEM AND METHOD FOR EVAPORATIVE FUEL VAPOR ENGINE

FIELD OF THE INVENTION

This invention relates to a fuel system for an evaporative fuel vapor engine, and more particularly to a vapor fuel generation and management system for an evaporative fuel vapor engine of an automobile.

BACKGROUND OF THE INVENTION

Fuel systems for most modern automotive engines utilize fuel injectors to deliver liquid fuel to the engine cylinders for combustion. The fuel injectors are mounted on a fuel rail to which liquid fuel is supplied from a liquid fuel tank by a pump. A pressure regulator maintains the required injector operational pressure. Excess liquid fuel that is not injected to the cylinders may be returned to the fuel tank by a fuel return line.

The generation of vapor in the liquid fuel tank may require a secondary system, i.e an evaporative emission control system, for controlling vapor emissions from the liquid fuel in the fuel tank. The evaporative emission control system includes a fuel vapor collection canister, e.g. a carbon or charcoal canister, that is connected to the headspace of the fuel tank to absorb and retain fuel vapor. The evaporative emission control system further includes a canister purge valve between the fuel tank and an intake manifold of the engine. An engine control management computer supplies a control signal for operating the canister purge valve to allow vapor flow from the tank headspace and the vapor collection canister to the engine intake manifold, where the vapor is consumed in the combustion process.

It is believed that there is a need for a fuel system that controls vapor emissions, and that generates and supplies vapor fuel, to an evaporative fuel vapor engine, thus modifying or eliminating the need for liquid fuel delivery to the engine cylinders.

SUMMARY OF THE INVENTION

The invention provides a vapor fuel generation and management system that uses liquid fuel from a liquid fuel tank, and fuel vapor from the head space of the liquid fuel tank, to create vapor fuel for use in an evaporative fuel vapor engine. An embodiment provides a vapor fuel generation and management system for an evaporative fuel vapor engine. The vapor fuel generation and management system includes a fuel tank that defines a chamber for storing an evaporative liquid fuel. The fuel tank has a liquid fuel outlet and a fuel vapor outlet. The system includes a carbon canister in communication with the fuel vapor outlet of the fuel tank. The vapor fuel generation and management system includes a fuel vaporization unit that generates vapor fuel, and has a liquid fuel inlet in communication with the liquid fuel outlet of the fuel tank, a fuel vapor inlet in communication with the carbon canister, and a vapor fuel outlet in communication with an engine intake manifold. The fuel vaporization unit includes a movable agitator member. The vapor fuel generation and management system includes a purge valve that may control all of the vapor fuel flow to the engine intake manifold.

The fuel vaporization unit may include a housing having a wall defining a chamber. The housing chamber may have a lower portion formed for a liquid fuel bath, and an upper portion formed for a vapor fuel space. The liquid fuel inlet of the fuel vaporization unit may include a first port in the housing wall, the fuel vapor inlet of the fuel vaporization unit may include a second port in the housing wall proximate the upper portion, and the vapor fuel outlet of the fuel vaporization unit may include a third port in the housing wall proximate the upper portion. The fuel vaporization unit may include a liquid fuel outlet in communication with a liquid fuel inlet of the fuel tank. The liquid fuel outlet of the fuel vaporization unit may include a fourth port in the housing wall proximate the lower portion. The fuel vaporization unit may include a liquid fuel level sensor in the lower portion. The evaporative liquid fuel of the vapor fuel generation and management system may be gasoline.

An embodiment of the invention also provides a fuel vaporization unit of a vapor fuel generation and management system for an evaporative fuel vapor engine. The fuel vaporization unit includes a housing having a wall defining a chamber. The housing chamber has a lower portion formed for a liquid fuel bath, and an upper portion formed for a vapor fuel space. A liquid fuel inlet port may be formed in the housing wall, a fuel vapor inlet port may be formed in the housing wall proximate the upper portion, a vapor fuel outlet port may be formed in the housing wall proximate the upper portion, and a liquid fuel outlet port may be formed in the housing wall proximate the lower portion. The fuel vaporization includes an agitator member at least partially disposed in the lower portion, and a motive force device that drives the agitator member.

The motive force device may be magnetically coupled to the agitator member for rotational driving of the agitator member. The agitator member may be formed of an annulus, disposed along a central longitudinal axis, having an inner surface and an outer surface, and a wall formed between the inner and outer surfaces. The annulus wall may include a first portion and a second portion, the first portion being substantially continuous along the inner and outer surfaces. The second portion may include a plurality of fin members, each having a longitudinal axis. The fin members may be cantilevered from the first portion of the annulus wall. The longitudinal axis' of the fin members may be disposed in the direction of the longitudinal axis of the annulus. The fin members may be spaced apart from adjacent fin members by substantially equal intervals.

The fuel vaporization unit may include a heater unit in thermal contact with the liquid fuel bath, and a liquid fuel level sensor in the lower portion. The evaporative liquid fuel of the fuel vaporization unit may be gasoline.

An embodiment of the invention also provides a method of generating vapor fuel in a fuel vaporization unit including a housing having a wall defining a chamber. The housing chamber has a lower portion and an upper portion. The method includes the steps of flowing a liquid fuel into the chamber through a first inlet port in the housing wall, forming a liquid fuel bath in the lower portion of the chamber, flowing a fuel vapor into the chamber through a second inlet port in the housing wall proximate the upper portion, moving an agitator member in the liquid fuel bath with a motive force device, forming vapor fuel in the upper portion of the chamber, and flowing the vapor fuel out of the chamber through an outlet port in the housing wall proximate the upper portion. The method may include the steps of magnetically coupling the motive force device to the agitator member and rotating the the agitator member, forming a vacuum at the outlet port with an evaporative fuel vapor engine manifold, and heating the liquid fuel bath.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTIONS OF THE PREFERRED EMBODIMENTS

Figure 1:
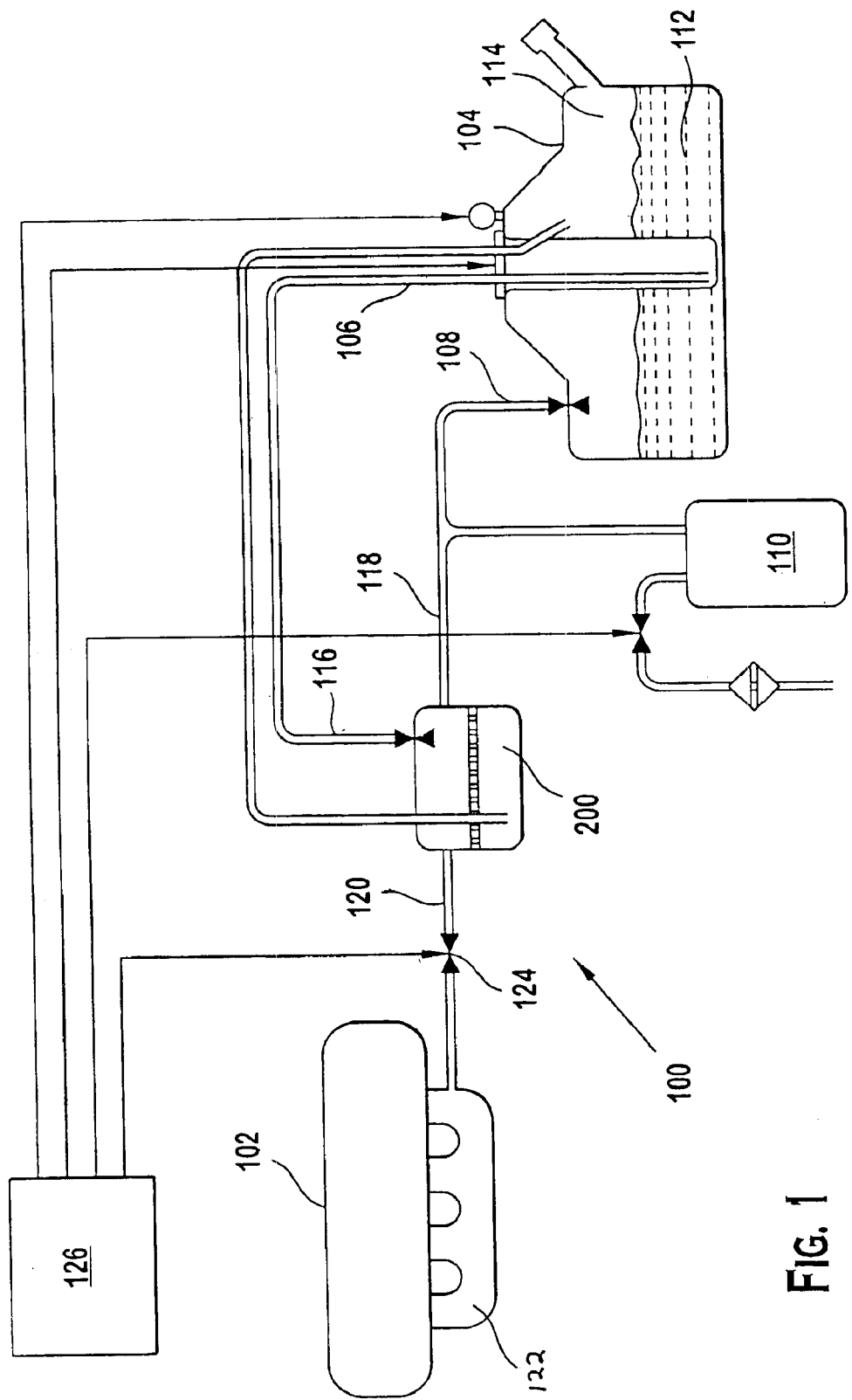
FIG. 1 is a schematic of a vapor fuel generation and management system for an evaporative fuel vapor engine, according to an embodiment of the invention.

FIG. 1 illustrates a preferred embodiment of a vapor fuel generation and management system 100 for an evaporative fuel vapor engine. The vapor fuel generation and management system includes a fuel tank 104. Fuel tank 104 forms a chamber for storing an evaporative liquid fuel 112. Liquid fuel 112 may be gasoline, for example. Vapor from evaporative liquid fuel 112 is formed in the liquid fuel tank headspace 114. The amount of vapor formed in fuel tank headspace 114 is a function of vehicle dynamics, slosh, temperature, the type and grade of the evaporative liquid fuel in tank 104, and the pressure in tank 104. A fuel vapor collection canister 110, e.g. a carbon or charcoal canister, is in fluid communication with a fuel vapor outlet 108 of fuel tank 104. Vapor collection canister 110 absorbs and retains fuel vapor formed in fuel tank headspace 114, as is known in the art. Vapor collection canister 110, and the canister vent may be sized to provide adequate air flow for the system 100.

Figure 2:
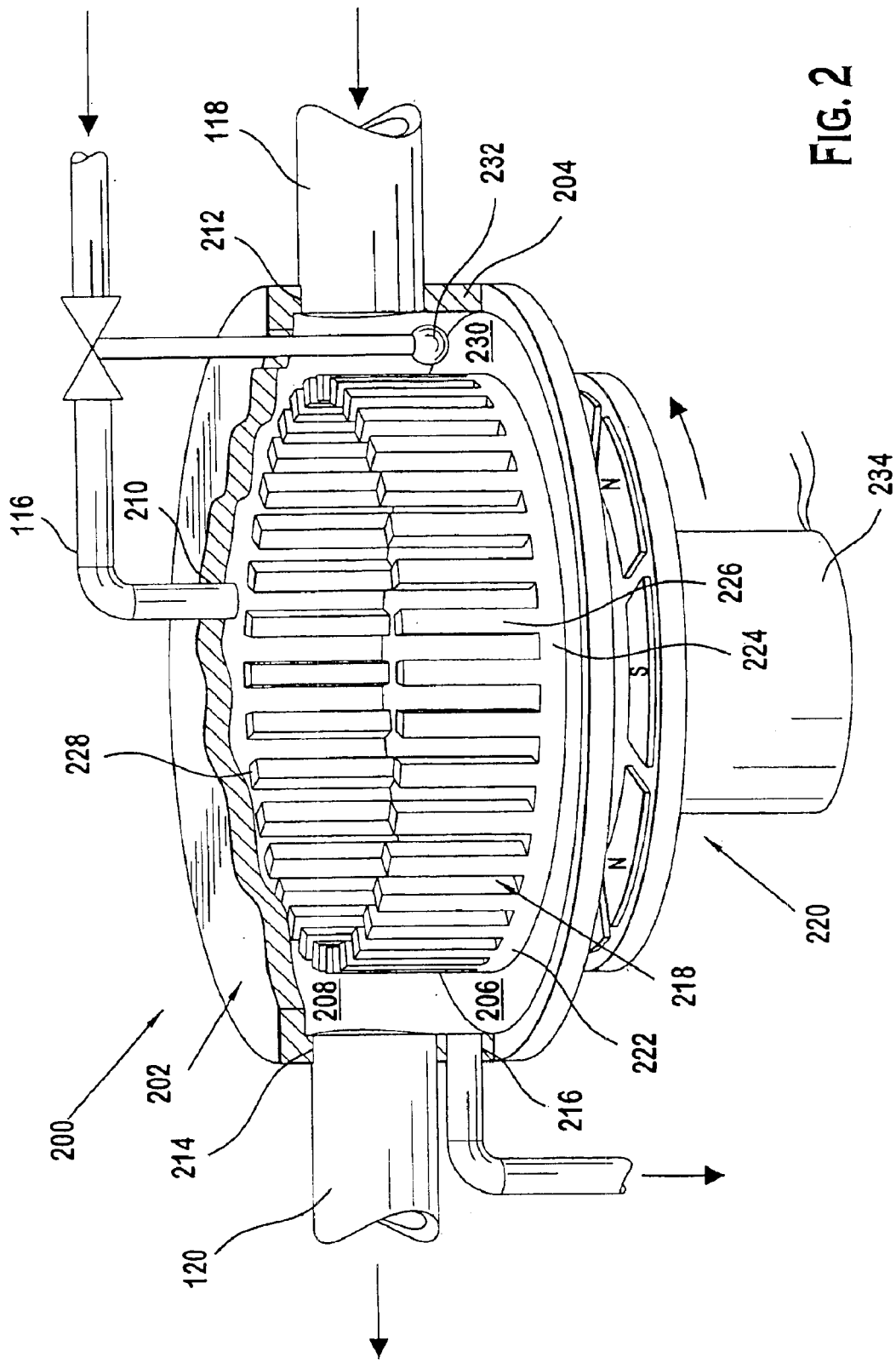
FIG. 2 is a perspective view of a fuel vaporization unit of a vapor fuel generation and management system for an evaporative fuel vapor engine, according to an embodiment of the invention.
Figure 3:
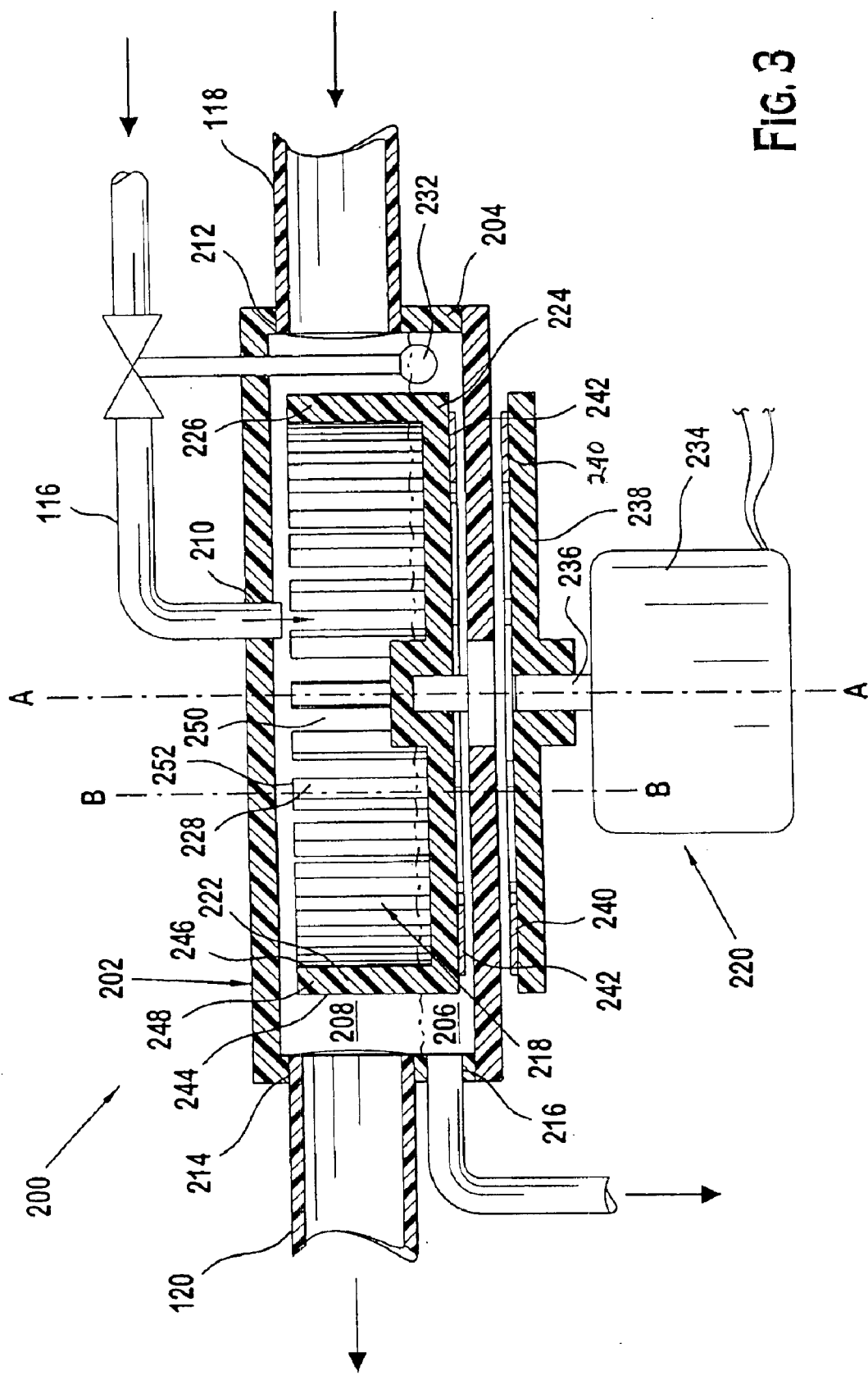
FIG. 3 is a cross-sectional view of the fuel vaporization unit of FIG. 2.

The vapor fuel generation and management system 100 includes a fuel vaporization unit 200. Fuel vaporization unit 200 is shown in FIGS. 2–3 in more detail, and is more fully described below. Fuel vaporization unit 200 generates a rich mixture of vapor fuel (i.e. a rich air/fuel mixture) from evaporative liquid fuel 112, and from a lean mixture of fuel vapor from vapor collection canister 110 and tank headspace 114, and supplies the rich mixture of vapor fuel to an engine intake manifold 122 of the evaporative fuel vapor engine 102. Evaporative liquid fuel 112 is supplied to fuel vaporization unit 200 through a liquid fuel inlet 116 that is in fluid communication with a liquid fuel outlet 106 of fuel tank 104. Fuel vapor collected in canister 110 is supplied to fuel vaporization unit 200 through a fuel vapor inlet 118 that is in fluid communication with vapor collection canister 110. Of course, the fuel vaporization unit 200 may be integrated with fuel tank 104 and vapor collection canister 110. Vapor fuel is supplied to engine intake manifold 122 through a vapor fuel outlet 120 in fuel vaporization unit 200. A purge valve 124 is controlled by an engine control unit 126, and regulates vapor fuel flow to engine intake manifold 122.

Referring to FIGS. 2 and 3, the fuel vaporization unit 200 includes a housing 202 formed of a wall 204 that defines a chamber. The housing chamber has a lower portion 206 and an upper portion 208. Lower portion 206 forms a liquid fuel bath for collection of evaporative liquid fuel supplied through liquid fuel inlet 116 from liquid fuel outlet 106 of fuel tank 104. Upper portion 208 forms a vapor fuel space for collection of fuel vapor supplied through fuel vapor inlet 118 from vapor collection canister 110 and tank headspace 114, for collection of ambient air from the canister vent, and for collection of vapor fuel generated by fuel vaporization unit 200. The phantom line in FIG. 3 represents a phase interface between liquid fuel and vapor fuel. A liquid fuel inlet port 210 may be formed in housing wall 204 at the liquid fuel inlet 116. A fuel vapor inlet port 212 may be formed in housing wall 204 at the fuel vapor inlet 118 proximate upper portion 208. A vapor fuel outlet port 214 may be formed in housing wall 204 at the vapor fuel outlet 120 proximate upper portion 208. As shown, outlet port 214 is disposed on the housing wall 204 opposite the inlet port 212. However, outlet port 214 may be angularly disposed with respect to inlet port 212. For example, outlet port 214 may be disposed on housing wall 214 at a location that is 270 degrees around the housing wall 214 from inlet port 212. In this manner, air flow over an agitator member 218 may be increased, as described below. A liquid fuel outlet port 216 may be formed in housing wall 204 proximate lower portion 206.

Fuel vaporization unit 200 includes agitator member 218. Agitator member 218 facilitates the generation of vapor fuel from the liquid fuel by agitating the liquid fuel. Agitator member 218 is at least partially disposed in the lower portion 206 forming the liquid fuel bath. Motive force device 220 drives agitator member 218 through the liquid fuel in the lower portion 206. Agitator member 218 may be adapted for rotational driving motion. Motive force device 220 may include an electric motor 234 that is magnetically coupled to agitator member 218 through housing 202 to rotate agitator member 218. Flange 238 may be secured to drive shaft 236, and may include magnet members 240 to magnetically attract corresponding ferrous plates 242 disposed on housing 202. In this manner, motive force device 220 can be electrically isolated from the chamber. It is to be understood however, that agitator member 218 could be adapted for reciprocal motion, orbital motion, vibrational motion, or any motion suitable for agitating the liquid fuel. The motive force device 220 could be a pneumatic device, a solenoid device, or any device suitable for driving agitator member 218, and could be coupled to agitator member 218 directly, or in any suitable manner. For example, motive force device 220 could be a pneumatic rotary device having a rotary shaft that is off-center to a rotary shaft of agitator member 218 such that agitator member is driven in orbital motion.

Agitator member 218 may be formed of an annulus 222 disposed along a central longitudinal axis A—A, and having an outer surface 244, an inner surface 246, and a wall 248 formed between outer surface 244 and inner surface 246. Annulus wall 248 includes a first portion 224 and a second portion 226. First portion 224 may be substantially continuous around outer surface 244 and inner surface 246. Second portion 226 may include a plurality of fin members 228. As illustrated in FIG. 3, fin members 228 may be defined by forming slots 250 in second portion 226, from an upper end 252 of second portion 226 toward first portion 224. Each fin member 228 may be disposed along a longitudinal axis B—B, and supported in a cantilevered manner on first portion 224, such that longitudinal axis B—B is substantially parallel to longitudinal axis A—A. Fin members 228 may be spaced apart from adjacent fin members by substantially equal intervals. Fin members 228 increase the surface area of agitator member 218 that contacts the liquid fuel, and agitate the liquid fuel as agitator member 218 is driven in the liquid fuel bath. In a preferred embodiment, agitator member 218 is approximately 3–4 inches in diameter. Of course, it is to be understood that agitator member 218 could be of any suitable form, and fin members 228 could be of any geometric form suitable for agitating the liquid fuel. For example, agitator member 218 could be box-shaped, or agitator member could be formed of a wall having perforations. Fin members could be cylindrical, for example, and could be disposed such that axis B—B is oblique to axis A—A.

Fuel vaporization unit 200 may vaporize liquid fuel by increasing the temperature of the liquid fuel. The fuel vaporization unit 200 may include a heater unit 230 in thermal contact with the liquid fuel bath or the inlet 116. Heater unit 230 facilitates vaporization of the liquid fuel by increasing the temperature of the liquid fuel. Fuel vaporization unit 200 may vaporize liquid fuel, for example, by increasing the free surface area of the liquid fuel, or by increasing vapor flow over the free surface of the liquid fuel. Fuel vaporization unit 200 may include a liquid fuel level sensor 232 that determines an amount of liquid fuel in lower portion 206 of the chamber. Sensor 232 may be, for example, a float that is operatively connected to a control valve in the fuel inlet 116 for metering the supply of liquid fuel to the vaporization unit 200.

Operation of a vapor fuel generation and management system, according to principles of the invention, provides a vapor fuel generation and management system for an evaporative fuel vapor engine, that generates and supplies sufficient vapor fuel to sustain operation of the engine without the need for a separate liquid fuel supply to the engine cylinders, such as fuel injectors and a fuel rail. Evaporative liquid fuel 112 may be stored in fuel tank 104 and may form vapor in fuel tank headspace 114. Vapor collection canister 110 absorbs and retains the fuel vapor formed in fuel tank headspace 114. Evaporative liquid fuel 112 is supplied to fuel vaporization unit 200 from liquid fuel outlet 106 through liquid fuel inlet 116, and forms a liquid fuel bath in lower portion 206 of fuel vaporization unit 200. Fuel vapor collected in canister 110 is supplied to fuel vaporization unit 200 through fuel vapor inlet 118, and forms a vapor fuel space in upper portion 208. Motive force device 220 drives agitator member 218, thus rotating fin members 228 through the liquid fuel bath and generating a homogeneous vapor fuel mixture in upper portion 208. A vacuum at engine intake manifold 122 draws the vapor fuel through vapor fuel outlet 120 and into intake manifold 122 for combustion. Purge valve 124 is controlled by an engine control unit 126, and regulates vapor fuel flow to engine intake manifold 122. The invention provides a vapor fuel generation and management system for an evaporative fuel vapor engine, that improves utilization of hydrocarbon vapor, and reduces hydrocarbon emissions through the tail pipe of an automobile.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A vapor fuel generation and management system for an evaporative fuel vapor engine, comprising:
   a fuel tank that defines a chamber storing an evaporative liquid fuel, the fuel tank having a liquid fuel outlet and a fuel vapor outlet;
   a carbon canister in communication with the fuel vapor outlet of the fuel tank;
   a fuel vaporization unit that generates vapor fuel, the fuel vaporization unit including a movable agitator member, the fuel vaporization unit having a liquid fuel inlet in communication with the liquid fuel outlet of the fuel tank, a fuel vapor inlet in communication with the carbon canister, and a vapor fuel outlet in communication with an engine intake manifold; and
   a purge valve that controls vapor fuel flow to the engine intake manifold.

2. The vapor fuel generation and management system of claim 1, wherein the fuel vaporization unit includes:
   a housing having a wall defining a chamber, the housing chamber having a lower portion and an upper portion, the lower portion formed for a liquid fuel bath, the upper portion formed for a vapor fuel space.

3. The vapor fuel generation and management system of claim 2, wherein
   the liquid fuel inlet of the fuel vaporization unit includes a first port in the housing wall;
   the fuel vapor inlet of the fuel vaporization unit includes a second port in the housing wall proximate the upper portion; and
   the vapor fuel outlet of the fuel vaporization unit includes a third port in the housing wall proximate the upper portion.

4. The vapor fuel generation and management system of claim 3, wherein the fuel vaporization unit includes a liquid fuel outlet in communication with a liquid fuel inlet of the fuel tank.

5. The vapor fuel generation and management system of claim 4, wherein the liquid fuel outlet of the fuel vaporization unit includes a fourth port in the housing wall proximate the lower portion.

6. The vapor fuel generation and management system of claim 5, wherein the fuel vaporization unit includes a liquid fuel level sensor in the lower portion.

7. The vapor fuel generation and management system of claim 1, wherein the evaporative liquid fuel is gasoline.

8. A fuel vaporization unit of a vapor fuel generation and management system for an evaporative fuel vapor engine, comprising:
   a housing having a wall defining a chamber, the housing chamber having a lower portion and an upper portion, the lower portion formed for a liquid fuel bath, the upper portion formed for a vapor fuel space;
   a liquid fuel inlet port in the housing wall;
   a fuel vapor inlet port in the housing wall proximate the upper portion;
   a vapor fuel outlet port in the housing wall proximate the upper portion;
   an agitator member at least partially disposed in the lower portion; and
   a motive force device that drives the agitator member.

9. The fuel vaporization unit of claim 8, wherein the motive force device is magnetically coupled to the agitator member for rotational driving of the agitator member.

10. The fuel vaporization unit of claim 9, wherein the agitator member comprises an annulus disposed along a central longitudinal axis, the annulus having an inner surface and an outer surface, and a wall formed between the inner and outer surfaces.

11. The fuel vaporization unit of claim 10, wherein the annulus wall includes a first portion and a second portion, the first portion being substantially continuous along the inner and outer surfaces.

12. The fuel vaporization unit of claim 11, wherein the second portion includes a plurality of fin members, each of the fin members having a longitudinal axis.

13. The fuel vaporization unit of claim 12, wherein at least one of the plurality of fin members is cantilevered from the first portion of the annulus wall.

14. The fuel vaporization unit of claim 13, wherein the longitudinal axis of the at least one of the plurality of fin members is disposed in the direction of the longitudinal axis of the annulus.

15. The fuel vaporization unit of claim 12, wherein
   each of the plurality of fin members is cantilevered from the first portion of the annulus wall, and
   the longitudinal axis of each of the plurality of fin members is disposed in the direction of the longitudinal axis of the annulus.

16. The fuel vaporization unit of claim 15, wherein each of the plurality of fin members is spaced apart from adjacent fin members by substantially equal intervals.

17. The fuel vaporization unit of claim 8, further comprising:
   a heater unit in thermal contact with the lower portion.

18. The fuel vaporization unit of claim 8, further comprising:
   a liquid fuel outlet port in the housing wall proximate the lower portion.

19. The fuel vaporization unit of claim 8, further comprising:
   a liquid fuel level sensor in the lower portion.

20. The fuel vaporization unit of claim 8, wherein the evaporative liquid fuel is gasoline.

21. A method of generating vapor fuel in a fuel vaporization unit for an evaporative fuel vapor engine, the fuel vaporization unit including a housing having a wall defining a chamber, the housing chamber having a lower portion and an upper portion, comprising:
   flowing a liquid fuel into the chamber through a first inlet port in the housing wall;
   forming a liquid fuel bath in the lower portion of the chamber;
   flowing a fuel vapor into the chamber through a second inlet port in the housing wall proximate the upper portion;
   moving an agitator member in the liquid fuel bath with a motive force device;
   forming vapor fuel in the upper portion of the chamber; and
   flowing the vapor fuel out of the chamber through an outlet port in the housing wall proximate the upper portion.

22. The method of generating vapor fuel of claim 21, wherein the step of moving an agitator member includes:
   magnetically coupling the motive force device to the agitator member; and
   rotating the agitator member.

23. The method of generating vapor fuel of claim 21, wherein the steps of flowing a fuel vapor into the chamber, and flowing the vapor fuel out of the chamber includes:
   forming a vacuum at the outlet port with an evaporative fuel vapor engine manifold.

24. The method of generating vapor fuel of claim 21, comprising:
   heating the liquid fuel bath.

* * * * *